(No Model.)
C. PFAUDLER.
STOP COCK.
No. 308,519. Patented Nov. 25, 1884.
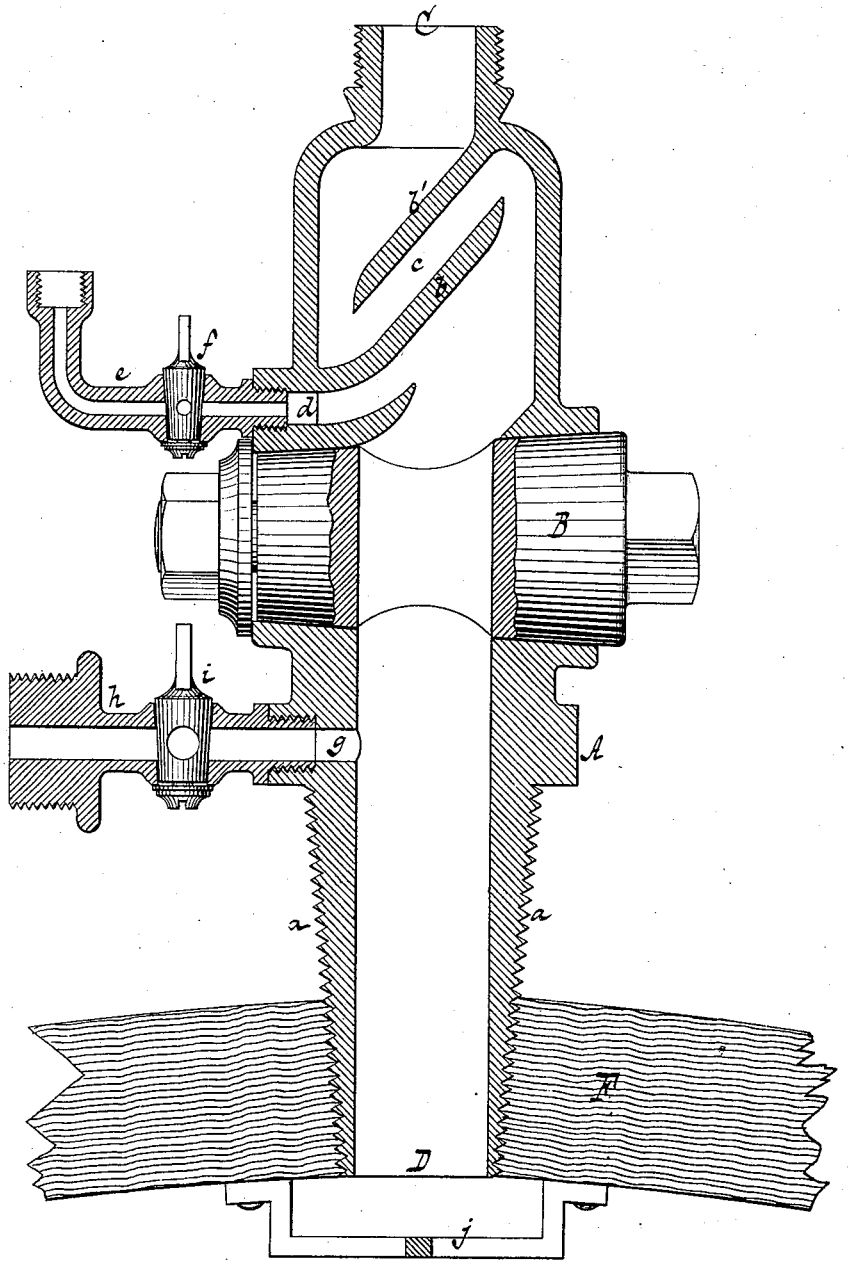
WITNESSES:
INVENTOR
Casper Pfaudler
BY
ATTORNEYS

UNITED STATES PATENT OFFICE.

CASPER PFAUDLER, OF ROCHESTER, NEW YORK.

STOP-COCK.

SPECIFICATION forming part of Letters Patent No. 308,519, dated November 25, 1884.

Application filed April 24, 1884. (No model.)

*To all whom it may concern:*

Be it known that I, CASPER PFAUDLER, a citizen of the United States, residing at Rochester, in the county of Monroe and State of New York, have invented new and useful Improvements in Stop-Cocks, of which the following is a specification.

This invention relates to a stop-cock which is provided with a lateral inlet and a trap, so that when the lateral inlet is connected with a water-supply tank situated at a higher level than the stop-cock the water flowing from the tank causes an upward current of liquid, as hereinafter more fully explained. The stop-cock is also provided with a lateral air-inlet, the object of which is hereinafter explained.

The accompanying drawing is a longitudinal central section.

In the drawing, the letter A designates the shell of my stop-cock, which is provided with an external screw-thread, $a$, for the purpose of securing the same in a cask, F, as indicated in the drawing. B is the plug, which extends transversely through the shell in the same manner as in ordinary stop-cocks.

Between the discharge-opening C and the plug B are two partitions, $b\ b'$, extending in opposite directions from the inner walls of the shell A, partially across the interior of the shell, so as to form a trap, $c$, and close to the partition $b$ is a lateral inlet, $d$, in which is secured a pipe, $e$, so that connection can be made with a water tank or reservoir situated on a higher level than the stop-cock. The pipe $e$ is provided with a stop-cock, $f$.

In the example shown in the drawing the partitions $b\ b'$ are inclined, and I consider this position the one best adapted for my purpose; but the object of forming the trap $c$ may be attained by different means, as will readily suggest themselves to a skillful mechanic.

Between the mouth D of the shell A and the plug B is a lateral inlet, $g$, into which is fitted a pipe, $h$, which is provided with a stop-cock, $i$. The pipe $h$ is intended to be connected with an air-pump, or with a reservoir containing air under pressure. The mouth D is protected by a grate, $j$, which may be secured to the shell A, or which may be fastened in the interior of the cask F, as shown in the drawing.

My stop-cock is intended particularly for the purpose of carrying off the barm which rises in fermenting-casks to the top of the fermenting liquid. In order to accomplish this purpose, I keep the cask full of liquid; and when the pipe $e$ is connected to the water-tank and the plug B and stop-cock $f$ are opened the water flowing in through the lateral inlet $d$ causes an upward current through the trap $c$, and by this current the barm is carried off through the discharge-opening C. At the same time the trap is filled with water and prevents the escape of gas from the cask. After the fermentation has been completed the plug B and stop-cock $f$ are closed and the stop-cock $i$ is opened, so that by the injection of compressed air into the cask the operation of racking is facilitated.

What I claim as new, and desire to secure by Letters Patent, is—

1. A stop-cock provided in its shell with a lateral inlet and with a trap between said lateral inlet and the discharge of the shell, substantially as and for the purpose described.

2. The combination, with the shell A and plug B, of a lateral inlet between the plug and the discharge-opening of the shell, a pipe and stop-cock connected to this lateral inlet, and the zigzag partitions $b\ b'$ in the interior of the shell, substantially as and for the purpose described.

In testimony whereof I have hereunto set my hand and seal in the presence of two subscribing witnesses.

CASPER PFAUDLER. [L. S.]

Witnesses:
W. HAUFF,
E. F. KASTENHUBER.